(12) United States Patent
Cook et al.

(10) Patent No.: US 7,703,477 B2
(45) Date of Patent: Apr. 27, 2010

(54) FLUID CONTROL VALVE

(75) Inventors: Gordon Cook, Andover (GB); Graeme Follet, Andover (GB)

(73) Assignee: Novamedix Distribution Limited, Nicosia (CY)

( * ) Notice: Subject to any disclaimer, the term of this patent is extended or adjusted under 35 U.S.C. 154(b) by 511 days.

(21) Appl. No.: 10/511,322

(22) PCT Filed: Apr. 14, 2003

(86) PCT No.: PCT/GB03/01591

§ 371 (c)(1),
(2), (4) Date: Aug. 2, 2005

(87) PCT Pub. No.: WO03/089821

PCT Pub. Date: Oct. 30, 2003

(65) Prior Publication Data
US 2006/0163506 A1    Jul. 27, 2006

(30) Foreign Application Priority Data
Apr. 18, 2002   (GB)   ................................ 0208840.9

(51) Int. Cl.
F16K 31/385    (2006.01)
F16K 7/10      (2006.01)

(52) U.S. Cl. .............................. 137/489; 137/492; 251/5
(58) Field of Classification Search ................ 251/4–7, 251/30.01, 33, 36, 47, 48; 137/488, 489, 137/492
See application file for complete search history.

(56) References Cited
U.S. PATENT DOCUMENTS

| | | | | |
|---|---|---|---|---|
| 2,247,363 A | * | 7/1941 | Dunn | .............................. 251/5 |
| 2,314,767 A | * | 3/1943 | Burrell | ............................ 251/8 |
| 2,331,291 A | * | 10/1943 | Annin | .............................. 251/5 |
| 2,470,744 A | * | 5/1949 | Korn | .............................. 251/5 |
| 2,573,864 A | * | 11/1951 | Moran | ............................ 251/5 |
| 2,621,889 A | * | 12/1952 | Annin | ......................... 251/25 |
| 2,622,620 A | | 12/1952 | Annin | |
| 2,786,642 A | * | 3/1957 | Comb | ............................ 251/5 |
| 3,007,492 A | * | 11/1961 | Grimmer | ..................... 137/492 |
| 3,118,646 A | * | 1/1964 | Markey | .......................... 251/5 |
| 3,354,970 A | * | 11/1967 | Lummus | ......................... 251/5 |
| 3,669,142 A | | 6/1972 | Gerbic | |

(Continued)

FOREIGN PATENT DOCUMENTS

CH    416 245 A    6/1966

(Continued)

*Primary Examiner*—John Rivell
(74) *Attorney, Agent, or Firm*—Birch, Stewart, Kolasch & Birch, LLP

(57) ABSTRACT

A fluid control valve for use with apparatus for medical use. Commercially available valves which operate by electrical, hydraulic or pneumatic means are often expensive and bulky. They may require excessive power to operate them and can be noisy during operation due to moving parts and fluid flow through internal pathways. The valve of the present invention has a valve seal (1) mounted between inlet (A) and outlet ports (B), with the seal including a valve closure member (4) operated by means of a control fluid fed through a control port (C) in the valve body. In operation a pressure differential acting to open and close the valve is set up between the inlet and outlet ports and the control port to operate the valve. This design results in cost savings and performance benefits compared with the prior art.

2 Claims, 7 Drawing Sheets

Valve in closed loop regulating mode.

U.S. PATENT DOCUMENTS

| | | | | |
|---|---|---|---|---|
| 3,703,213 A | * | 11/1972 | Kammerer et al. | 251/5 |
| 3,840,207 A | * | 10/1974 | Carpenter, Jr. | 251/5 |
| 4,056,965 A | * | 11/1977 | Heiser | 72/351 |
| 4,300,748 A | * | 11/1981 | Kreeley | 251/5 |
| 4,412,554 A | * | 11/1983 | Chow | 137/375 |
| 4,645,174 A | * | 2/1987 | Hicks | 251/5 |
| 4,730,635 A | * | 3/1988 | Linden | 137/1 |
| 4,796,804 A | * | 1/1989 | Weiss | 251/5 |
| 5,049,042 A | * | 9/1991 | Mathieu et al. | 251/5 |
| 5,136,898 A | * | 8/1992 | Hirose | 251/47 |
| 5,819,801 A | * | 10/1998 | Palffy | 137/826 |
| 6,047,943 A | * | 4/2000 | Hussey | 251/5 |
| 6,568,416 B2 | * | 5/2003 | Tucker et al. | 137/14 |

FOREIGN PATENT DOCUMENTS

| | | |
|---|---|---|
| EP | 0 800 032 A | 10/1997 |
| GB | 2 091 853 A | 8/1982 |

* cited by examiner

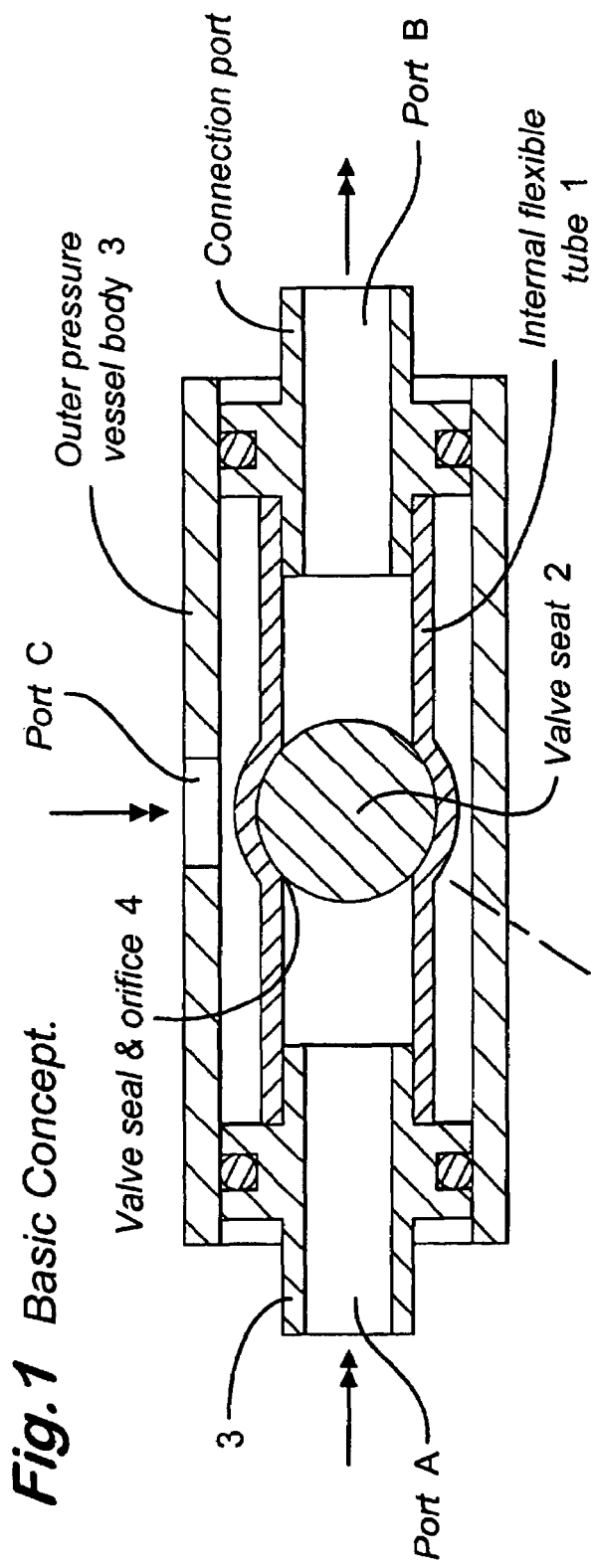
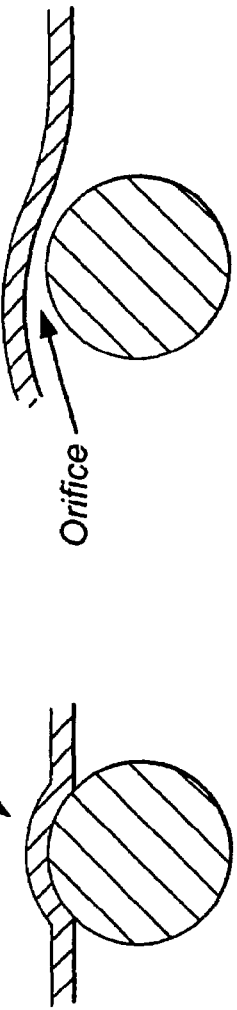
Fig. 1 Basic Concept.
Fig. 1A Valve seal closed.
Fig. 1B Valve seal open.

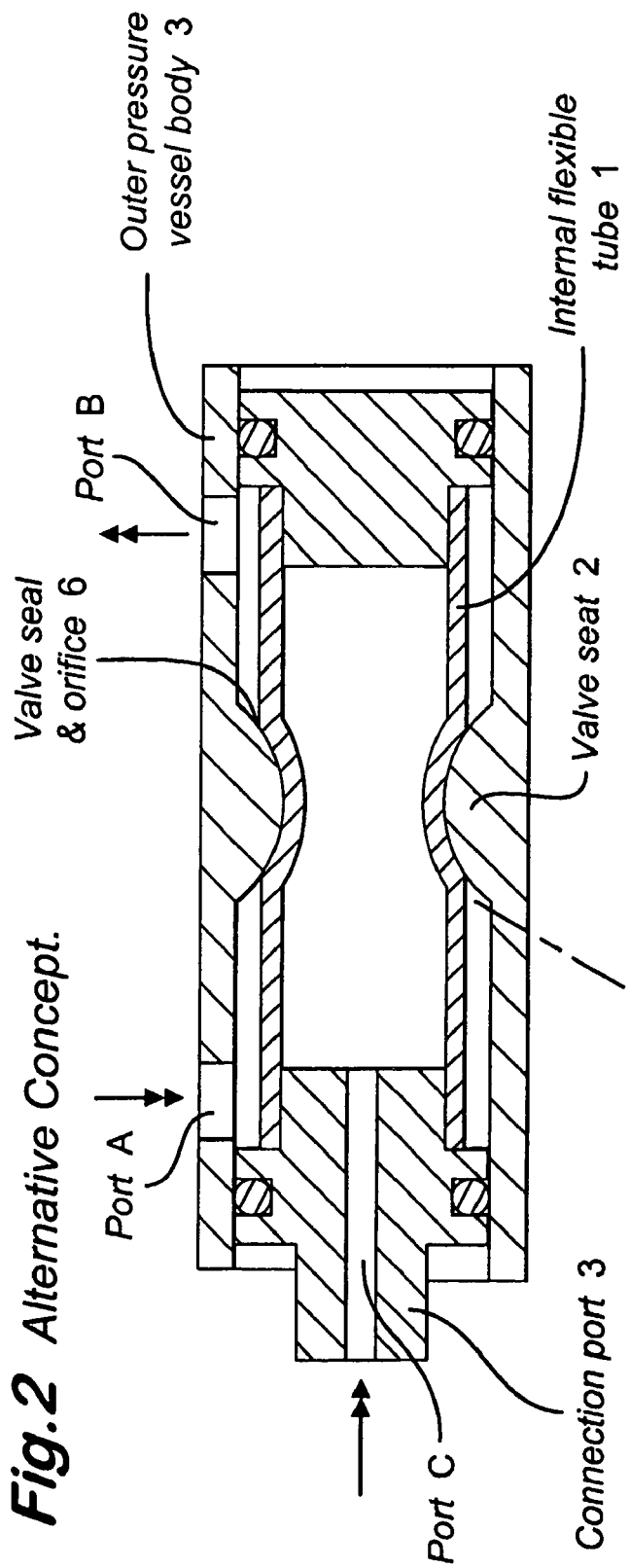
Fig. 2 Alternative Concept.
Fig. 2A Valve seal closed.
Fig. 2B Valve seal open.

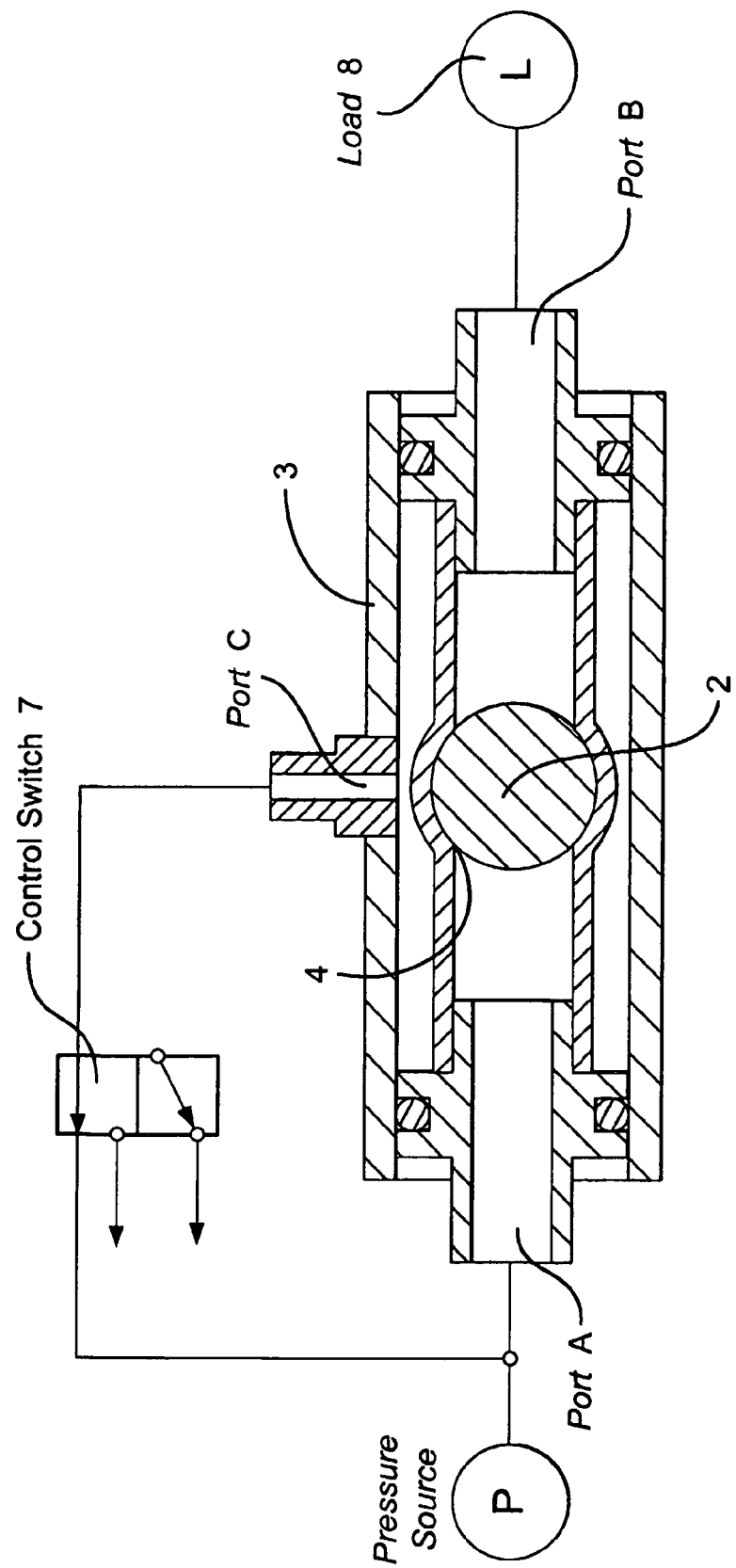
Fig.3 Valve in switching mode.

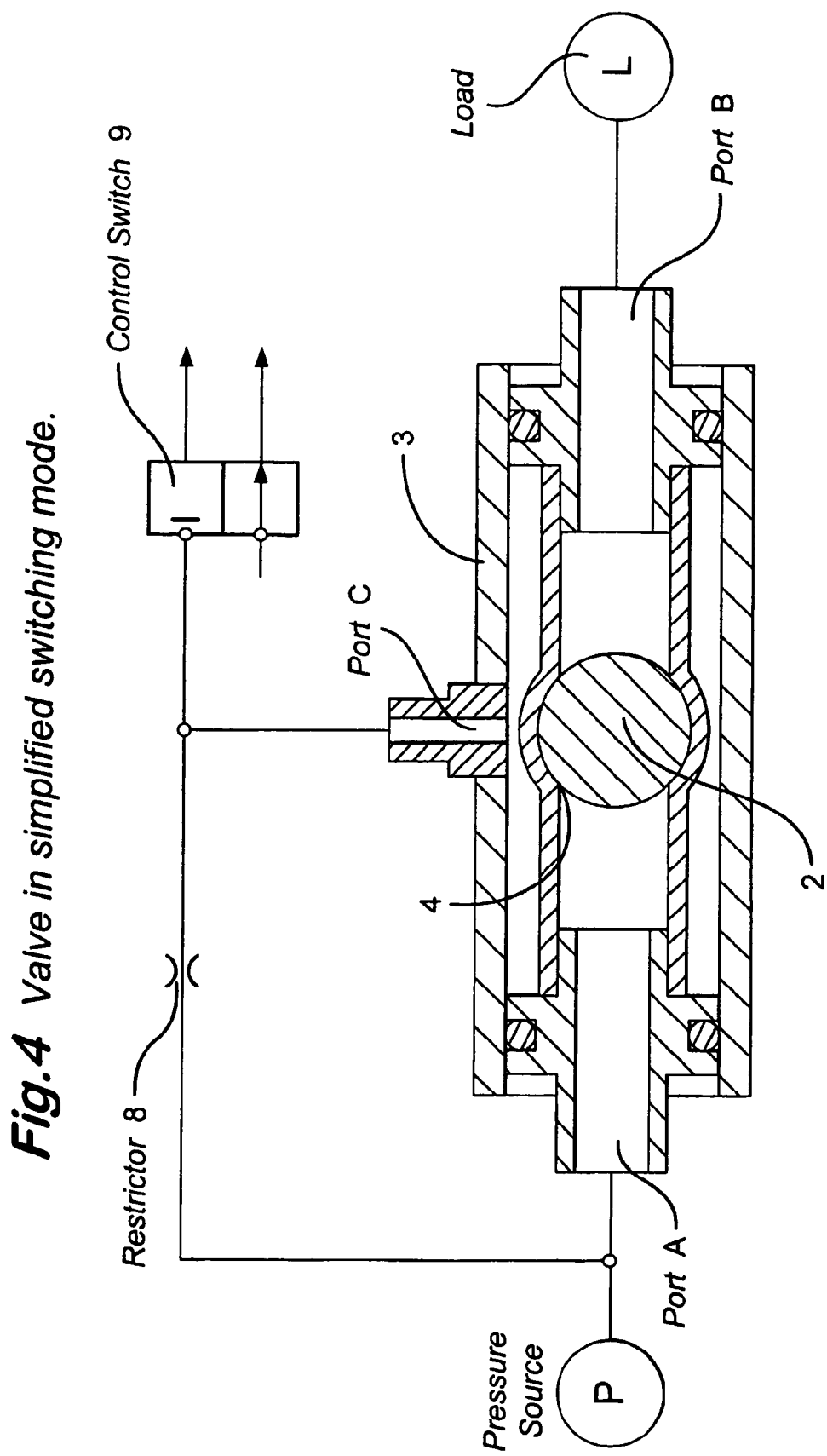
Fig. 4 Valve in simplified switching mode.

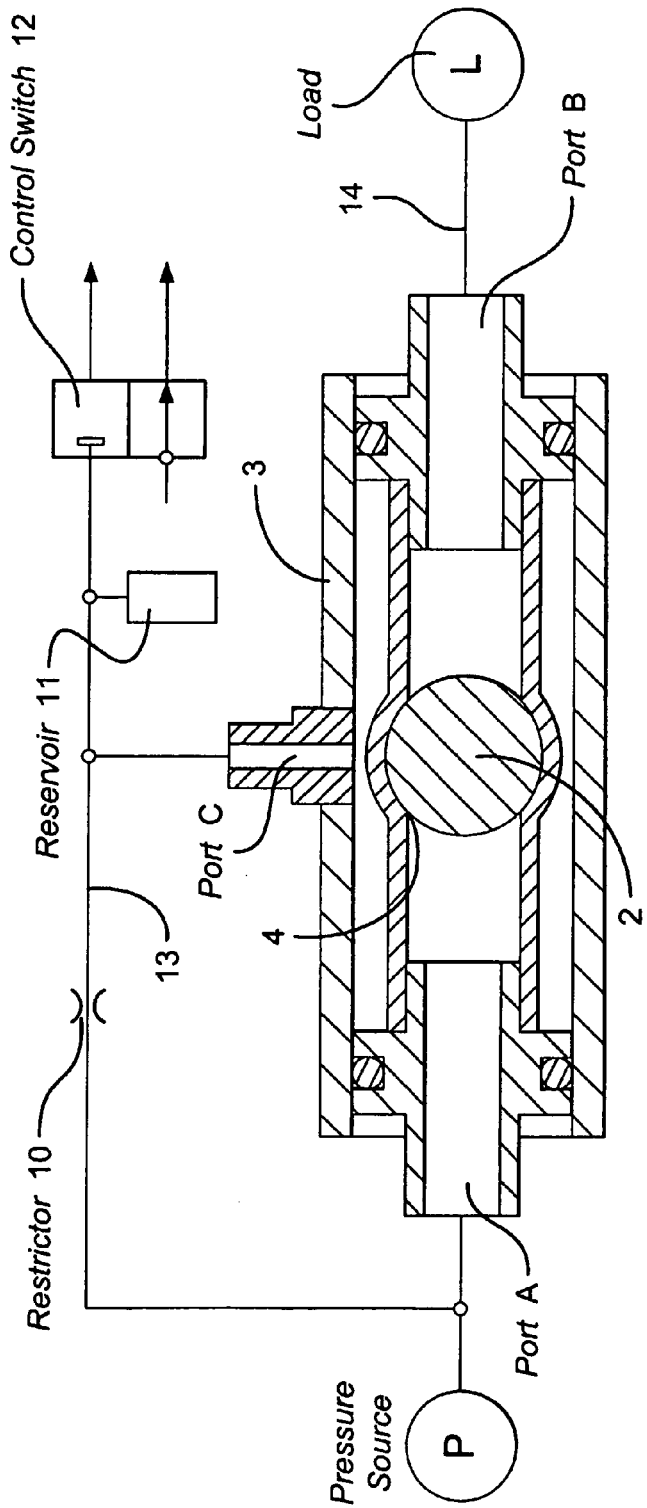
Fig.5 *Valve in timing mode.*
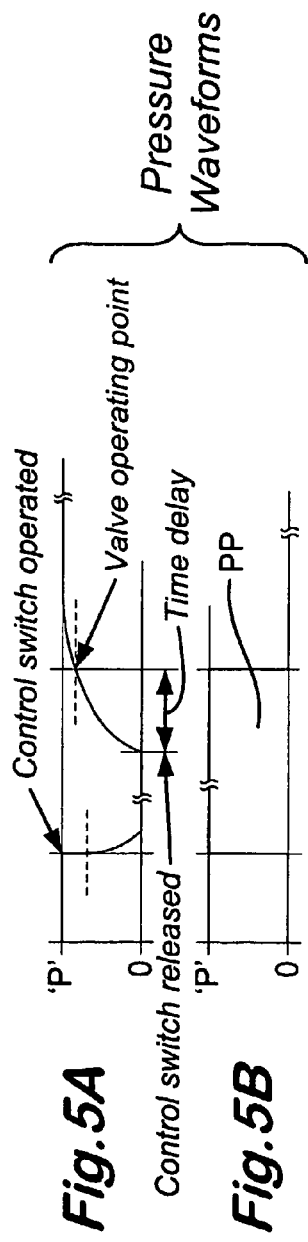
*Fig.5A*
*Fig.5B*

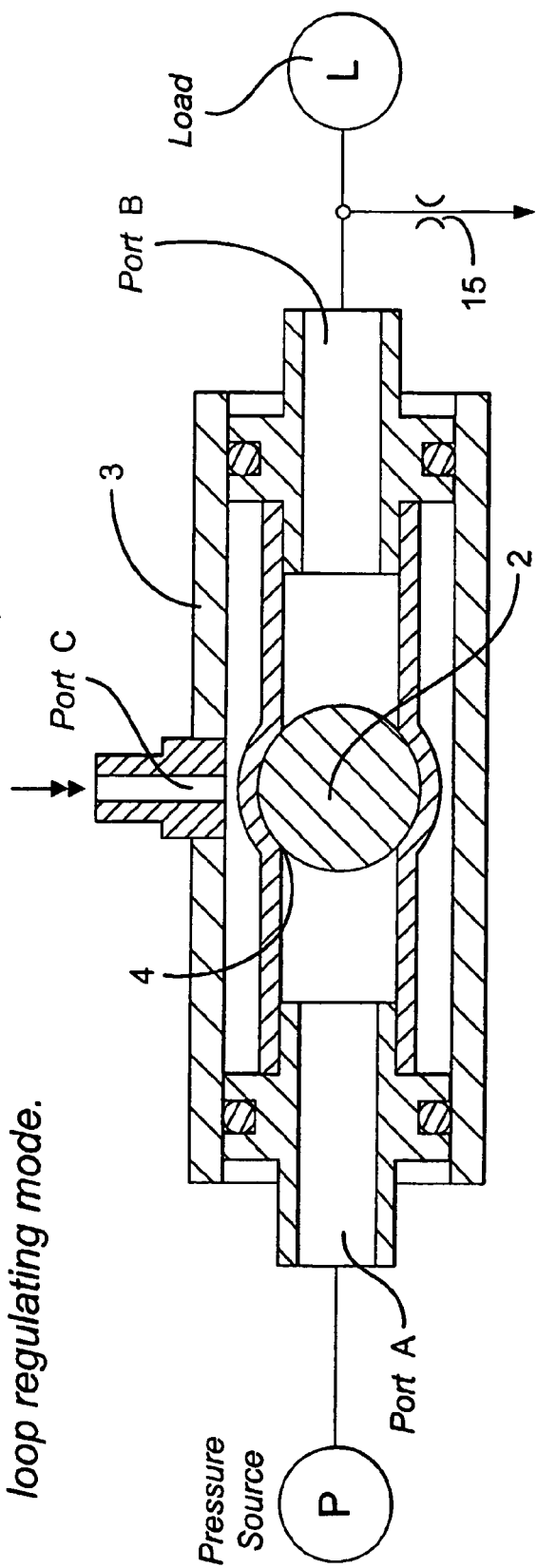
Fig. 6 Valve in open loop regulating mode.
Fig. 6A Variation of load pressure with control pressure for fixed source pressure.

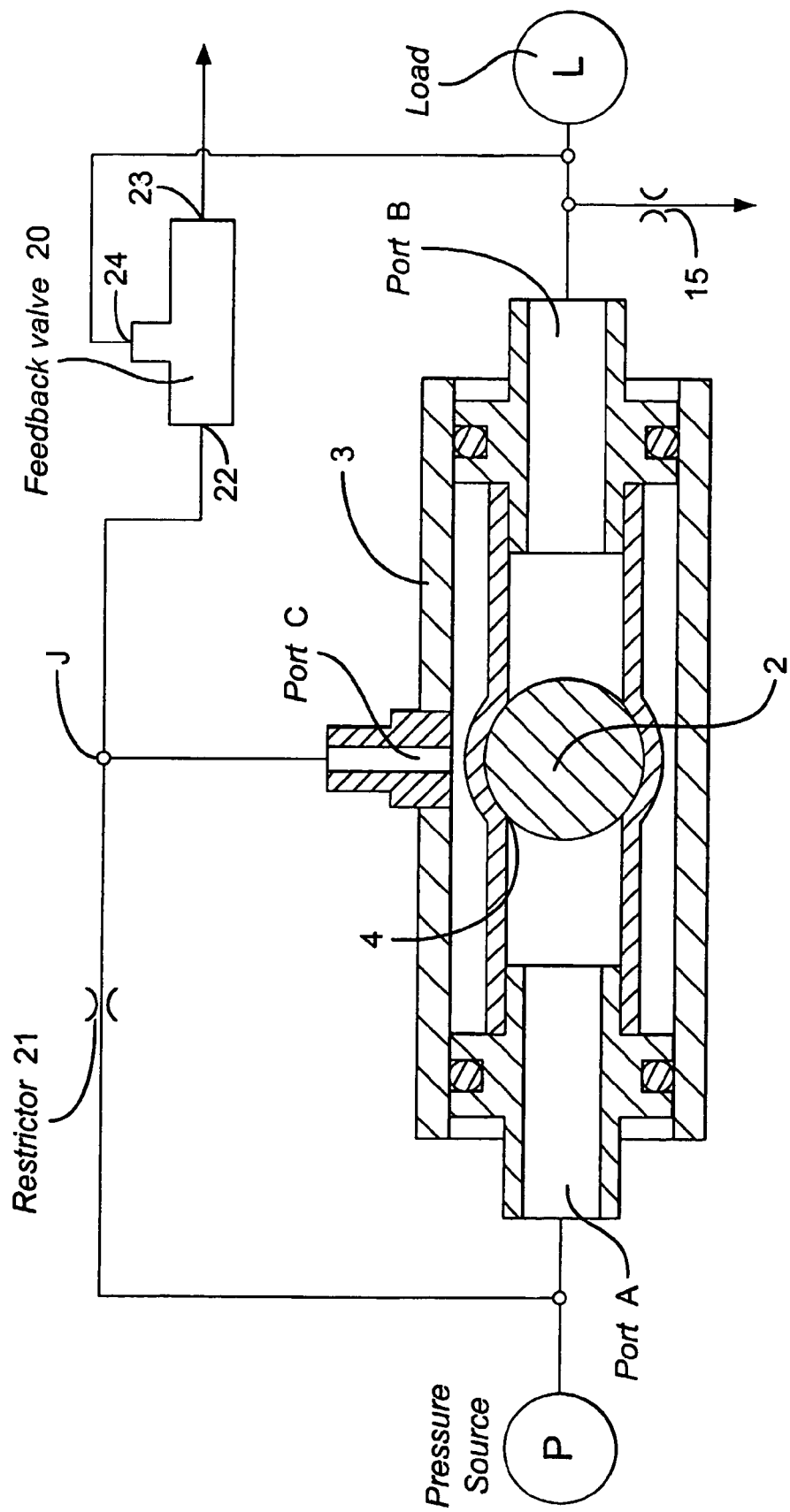
*Fig. 7* *Valve in closed loop regulating mode.*

FLUID CONTROL VALVE

FIELD OF THE INVENTION

The present invention relates to a fluid control valve and particularly to a fluid control valve for use with apparatus for medical use.

BACKGROUND OF THE INVENTION

The control of fluid is an essential element in the process and manufacturing industry or in applications where such conditions are utilised for the benefit or well being of mankind such as in medical apparatus.

Valves are commercially available which operate by electrical, hydraulic or pneumatic means to open, close or regulate flow or pressure within acceptable parameters. Such valves are often expensive and bulky, may require reasonable power to operate and can be noisy in operation due to moving parts and fluid flow through internal pathways.

SUMMARY OF THE INVENTION

It is an object of the invention to provide a fluid control valve from which cost savings and performance benefits can be obtained compared with the prior art through, for example, injection moulding of miniaturised components.

The control value in accordance with an object of the invention may be scaled for differing operating pressure and flow applications within the limits of the materials selected.

According to the invention there is provided a valve for controlling fluid flow comprising a valve for controlling fluid flow comprising a valve body having an inlet and outlet port for fluid flow from a fluid pressure source, a valve seal mounted between the inlet and outlet ports, the valve seal having a valve closure member constrained to engage a valve seat in the closed position of the valve, a control port in the valve body for providing a control fluid acting to maintain the valve closure member in the closed position under a pressure differential as between that applied to one side of the closure member by said fluid flow through the inlet port acting to lift the closure member off the valve seat, and that applied on the other side of the closure member through said control port to close the valve, and control means for varying said differential pressure to control movements of the valve closure member and regulate fluid flow through the valve.

Advantageously the valve seal is formed between the inner wall of a flexible conduit acting as the valve closure member with a valve seat preferably of spherical form mounted within the conduit to engage the inner wall of the flexible conduit in the closed position of the valve.

BRIEF DESCRIPTION OF THE DRAWINGS

The invention will now be described by way of example with reference to the accompanying drawings wherein:

FIGS. 1, 1A and 1B illustrate in schematic section one embodiment of the invention;

FIGS. 2, 2A and 2B illustrate in schematic section another embodiment of the invention;

FIGS. 3 is an illustration in schematic cross section of the valve of FIG. 1 in one operating mode;

FIG. 4 is an illustration in schematic section of the valve of FIG. 1 in another operating mode;

FIGS. 5, 5A and 5B illustrate in schematic section and graphical form the valve of FIG. 1 acting in a timing mode.

FIGS. 6 and 6A illustrate in schematic section and graphical form the valve of FIG. 1 operating in an open loop regulating mode and FIG. 7 is an illustration in schematic section of the valve of FIG. 1 operating in a closed loop regulating mode

BEST MODES OF CARRYING OUT THE INVENTION

The valve shown in FIG. 1, 1A and 1B has an internal flexible tubular component 1 containing, and in immediate contact with, a spherical valve seat 2 retained between connection ports A, B at each end. The flexible tubular component 1 is contained within an outer pressure vessel 3 to which a further port C is connected.

A valve seal 4 is formed between the inner wall of the flexible tubular component 1 and the outer diameter of the valve seat 2. In the example shown see FIG. 1A the valve is configured as normally closed due to the valve seat 2 having a larger diameter than the bore of flexible tubular component 1.

In use the input or source pressure is connected to port A and the output connection taken from port B. The valve is controlled by application of pressure to port C. When the valve is operated fluid flows freely from port A to port B through the valve seal 4, opening as a complete or partial circumferential orifice between the flexible tubular component 1 and the valve seat 2.

If pressure is applied singularly to port A the valve seal 4 will remain closed until the pressure exerts sufficient force to cause the tubular component 1 to expand circumferentially; due to differential internal to external pressure, lift off the valve seat 2 and allow fluid to flow from port B see FIG. 1B.

If pressure is coincidentally applied to port C the outer pressure vessel 3 is pressurised and force applied to the external surface of the tubular component 1, so that the differential pressure effect across the tubular component 1 is reduced or eliminated, causing the tubular component 1 to recover onto the valve seal 4 and close the orifice see FIG. 1A.

In the present invention the tubular component 1 is preferably constructed from a thin walled silicone polymer material selected for an appropriate shore hardness that will ensure sufficient closure force and orifice area at the working pressure. The valve seat 2 is constructed from brass or other suitable metal, or may be selected from a polymeric or plastic material to optimise closure and orifice characteristics over the desired operating temperature range, or fluid employed.

An alternative design of the valve in accordance with the present invention is shown in FIGS. 2, 2A and 2B.

The principle of the alternative valve arrangement is similar to the valve arrangement shown in FIG. 1 with the exception that the valve is constructed in a transposed manner.

The valve in FIG. 2 has an internal tubular component 1 as in FIG. 1, in immediate contact with an external valve seat formed as an annular protuberance 5 on the inner wall of the pressure vessel 3. The tubular component 1 is retained between connection ports A, B, C with a single or blanked aperture.

A valve seal 6 is formed between the outer wall of the tubular component 1 and the valve seat 5 on the inner diameter of the outer vessel 3. In the example shown, see FIG. 2A, the valve is configured as normally closed due to the valve seat 5 having a smaller diameter than the diameter of the tubular component 1.

In use the input or source pressure is connected to port A and the output connection taken from port B. The valve is controlled by application of pressure to port C. When the valve is operated fluid flows freely from port A to port B through the valve seal 6, opening as a complete or partial circumferential orifice between the tubular component and valve seat S.

If pressure is applied singularly to port A the valve seal 6 will remain closed until the pressure exerts sufficient force to cause the tubular component 1, to reduce circumferentially; due to differential external to internal pressure, lift off the valve seat 5 and allow fluid to flow from port B, see FIG. 2B.

If pressure is coincidentally applied to port C the bore of the tubular component 1 is pressurised and force applied to the inside diameter of the tubular component 1, so that the differential pressure effect across the component 1 is reduced or eliminated, causing the component 1 to recover onto the valve seat 5, reinstate the valve seal 6 and close the orifice.

An operative switching mode for the valve of FIG. 1 (and equally the valve of FIG. 2) is shown in FIG. 3. FIG. 3 illustrates how the valve of FIG. 1 is used to control the flow of fluid from a pressure source P to a load L by actuation of a control switch by pressurised fluid, vacuum or electrical energisation. The pressure at port A is applied through a normally open switch 7 to the control port C. As there is no differential applied to the tubular component 1 the valve seal 4 is closed and no fluid flows to the load. When the control switch 7 is opened the pressure at port C is vented to atmosphere through the control switch 7, the valve seal 4 opens due to the differential force applied to the flexible tube, and fluid flows to the load L.

A simplified switching mode of the valve shown in FIG. 1 to that illustrated in FIG. 3 to control pressure at control port C, is shown in FIG. 4.

The pressure at port C is applied through a restrictor 8 selected to pass sufficient flow to pressurise the outer pressure vessel 3 in an acceptable time without venting to atmosphere an excessive amount during the alternate valve state. A normally closed control switch 9 connected to port C holds the outer pressure vessel 3 pressurised. When the control switch 9 is actuated the fluid in the outer pressure vessel 3 is vented and the valve seal 4 opens as described previously.

A simple switch arrangement 9 may be constructed by providing a small aperture, which is either occluded or uncovered, and connected as shown in FIG. 4.

FIG. 5 shows one example of the valve of FIG. 1 used as a timing element, whereby a pressure pulse may be obtained.

The pressure applied from pressure source P at port C in the arrangement shown in FIG. 5 is applied through a restrictor 10 selected to pass flow to pressurise the outer pressure vessel 3 and an associated reservoir 11. The reservoir 11 may be an external component as shown or the volume of the outer pressure vessel 3 increased to accommodate the necessary volume within the valve structure. A normally closed control switch 12 is also connected in the circuit which may have either a permanent, momentary or impulsive open state.

In the normal condition the outer pressure vessel 3 is pressurised and no fluid flows between port A and port B. When the control switch 12 is activated the outer pressure vessel 3 and reservoir 11 are vented and the valve seal 4 opens allowing fluid to flow from port A to port B.

When the control switch 12 is reset, released, or impulsively closes the outer pressure vessel 3 and reservoir 11 re-pressurise through the restrictor 10 and the valve orifice is sealed.

Pressure waveforms illustrated by the variation in pressure at points 13, 14 in the control circuit are shown in FIGS. 5A, 5B respectively. It will be seen that a pressure pulse PP is produced at the output load L for each activation of the switch 12.

The duration that the orifice is open is dependent on the combined outer pressure vessel 3 and the volume of the reservoir 11 the flow rate of the restrictor 10 and valve characteristics. A short duration delay of a fraction of a second to several seconds may be controlled by suitable design of the variables, which for example may be used to control an impulsive flow of fluid to the load L.

In FIG. 6 there is illustrated an application of the valve of FIG. 1 in an open loop regulating mode. The downstream or load pressure (or flow) at port B is affected by the pressure applied to the control pressure at port C. The load L is shown as having a flow-restricted vent 15 to atmosphere, which, in this example, would require to be selected as being significant, compared with the valve seal 4.

If the pressure at port C is substantially the same as the pressure at port A the pressure at port B will be zero, as the valve seal 4 will pass no fluid flow. Conversely, if the pressure at port C is at zero the pressure at port B will be the same as at port A since the valve seal 4 will be opened to maximum orifice size and therefore minimum flow restriction.

The performance of the valve is therefore bounded by the two extremes, but the response may be configured at other intermediate points to suit the application as depicted in the graphical representation at FIG. 5A by selection of materials and sizing of component parts. The response may, for example, approximate to a linear, non-linear 18, 19, as shown in FIG. 6A, or stepped relationship.

In FIG. 7 there is illustrated an application of the valve of FIG. 1 in a closed loop regulating mode. By utilising a secondary valve 20 of similar construction to that shown in FIG. 1 to act as a feedback valve a positive feedback circuit arrangement can be employed to stabilise the pressure (or flow) essentially independent of the load L or source pressure P.

A restrictor 21 connected to the pressure source P supplies flow to the input port 22 of the feedback valve 20. The output port 23 of the feedback valve 20 is vented to atmosphere and the control port 24 connected to the output port B of the primary valve and the load L. The junction J of the series connection between restrictor 21 and feedback valve 20 forms a pressure divider, which is connected to the outer pressure vessel 3 at port C of the primary valve.

If the load pressure should increase, the pressure applied to the control port 24 of the feedback valve 20 is increased causing the flow through the feedback valve 20 to be reduced for reasons explained previously. Consequently, the pressure at the junction of the restrictor 20 and port 22 of the feedback valve 20 is increased and this is applied to the control port C of the primary valve causing it to reduce flow passage and therefore, pressure, to restore the original imbalance. Should the load pressure decrease the feedback circuit will compensate in a comparable manner.

It is anticipated that the secondary on feedback valve 20 could be accommodated within the construction of the structure of the primary valve should this be desirable and that differences in materials and sizing would be employed should a significant differential exist between the source pressure P and desired load pressure L.

Other features and advantages of the present invention will be apparent to those skilled in the art but all falling within the scope of the appended claims. For example the valve seat 2 as described herein need not be spherical but may be of other shapes and still engage the tubular conduit 1 to form a closed seal due to the flexible nature of the conduit.

The invention claimed is:

1. A valve for controlling fluid flow in a main fluid flow path of a fluid system which has a source of fluid pressure, a load and a feedback valve, comprising:

a primary valve body having an inlet and outlet port for fluid flow from a fluid pressure source and a flexible conduit which extends along a greater portion of an extended length path, wherein the flexible conduit also forms a valve seal closure member constrained to engage only a non-porous valve seat which extends along only a minor portion of the extended length of the extended length path in the closed position of the valve;

a control port in the primary valve body for providing a control fluid acting to maintain the valve seal closure member in the closed position under a pressure differential as between that applied to one side of the valve seal closure member by said fluid flow through the inlet port acting to lift the valve seal closure member off the valve seat, and that applied on the other side of the valve seal closure member through said control port to close the valve;

a restrictor connected to the pressure source to supply fluid flow to an input port of the feedback valve which has an output port vented to atmosphere and a control port connected to the output port of the primary valve and the load, wherein a junction of a connection between the restrictor and the feedback valve forms a pressure divider which is connected to an outer pressure vessel at the control port of the primary valve; and wherein in response to an increase of load pressure, the pressure applied to the control port of the feedback valve is increased causing a reduction in fluid flow through the feedback valve so that pressure at a junction of the restrictor and input port of the feedback valve is increased and applied to the control port of the primary valve causing it to reduce flow passage and therefore, pressure, to restore an original imbalance and wherein the feedback valve has an inlet and outlet port for fluid flow from a fluid pressure source and a flexible conduit which extends along a greater portion of an extended length path, wherein the flexible conduit also forms a valve seal closure member constrained to engage only a non-porous valve seat which extends along only a minor portion of the extended length of the extended length path in the closed position of the valve, and is between the control port and the outlet port for varying the pressure of fluid at the control port in response to an imbalance in pressure at the outlet port thereby to stabilise the pressure or fluid flow at the outlet port.

2. A valve as claimed in claim 1 wherein the conduit is circular in cross section and the valve seat in the form of a sphere of larger cross section.

* * * * *